July 24, 1923.

T. K. JACKSON

VEHICLE HANDHOLD

Filed Aug. 14, 1920

1,462,914

Witness:—
Chas. L. Griesbauer

Inventor
Theodore K. Jackson,
By Royal C. Burnham,
Attorney

Patented July 24, 1923.

1,462,914

UNITED STATES PATENT OFFICE.

THEODORE K. JACKSON, OF MOBILE, ALABAMA.

VEHICLE HANDHOLD.

Application filed August 14, 1920. Serial No. 403,601.

*To all whom it may concern:*

Be it known that I, THEODORE K. JACKSON, a citizen of the United States, residing at Mobile, in the county of Mobile and State of Alabama, have invented certain new and useful Improvements in Vehicle Handholds, of which the following is a specification, reference being had therein to the accompanying drawing.

This invention relates to the association of handholds with vehicle-seats, and it particularly is adapted to use in motor-vehicles.

It is an object of the invention so to locate handholds that they may be grasped conveniently by the occupant or occupants of a seat to prevent him or them from being thrown upwardly when the vehicle is traversing rough roadways.

The characteristics of the invention will be apparent from the accompanying drawing, forming part hereof, wherein embodiments of the invention are disclosed, for purposes of illustration.

Like reference-characters refer to corresponding parts in the views of the drawing, of which—

Figure 1:
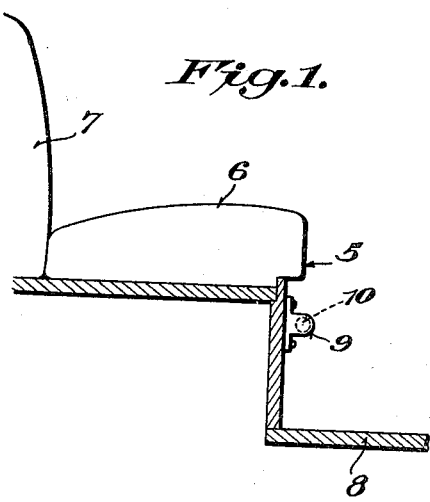
Fig. 1 is a side elevation of a vehicle-seat having one embodiment of the invention associated therewith.

Having more particular reference to the drawing, 5 designates a vehicle-seat of a type commonly used in motor-vehicles, having the usual seat and back cushions 6 and 7, respectively, and 8 designates the floor of the vehicle.

Figure 2:
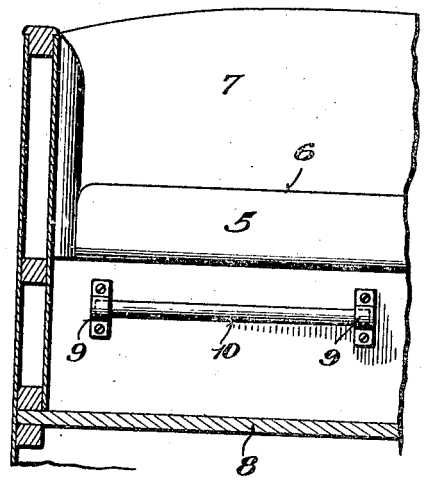
Fig. 2 is a front elevation thereof.

In one embodiment of the invention, as disclosed by Figs. 1 and 2, supports 9 are secured to the front of the seat structure between the seat-cushion or other occupant-bearing portion and the floor, and a hand-rail 10 is carried by those supports.

Figure 3:
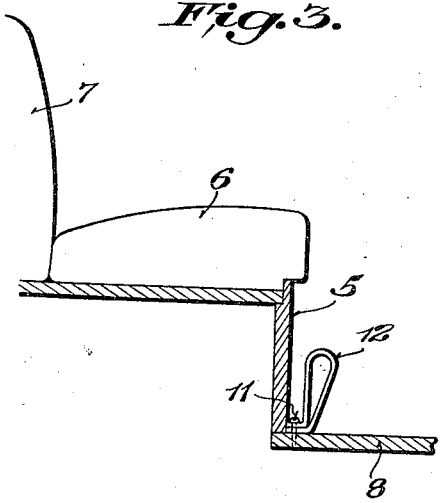
Fig. 3 is a side elevation of a vehicle-seat having another embodiment of the invention associated therewith.
Figure 4:
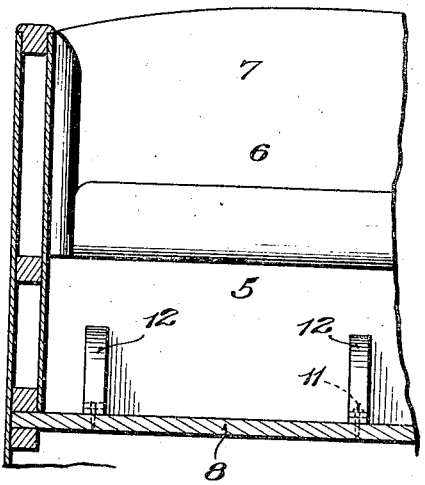
Fig. 4 is a front elevation thereof.

In another embodiment of the invention, as disclosed by Figs. 3 and 4, fastenings 11 are secured in the floor in front of and near the seat, and hand-straps 12 are connected to the fastenings.

The handholds (rail 10 and straps 12) thus located are in positions where it is convenient for the occupant or occupants of the seat to grasp them on inclining slightly forward, and they are approximately under the center of effort in a person whom the vertical movement of the vehicle tends to throw from the seat. Therefore, it is necessary for a person to exercise less effort to retain himself on the seat than where handholds are placed at the back or in the center of the seat.

Moreover, handholds positioned in accordance with this invention are out of the way, and thus they are not liable to cause inconvenience to an occupant, as is the case with handholds located in or at the back of the seat.

Having thus described my invention, what I claim as new, and desire to secure by Letters Patent, is—

In a vehicle, the combination, with a seat, of a handhold extending transversely of the vehicle on the front portion of the seat-structure below the occupant-bearing portion thereof arranged to be grasped by a person on the seat when inclining forwardly whereby he may prevent himself from being thrown upwardly.

In testimony whereof I affix my signature.

THEODORE K. JACKSON.